US012054624B2

(12) United States Patent
Sato et al.

(10) Patent No.: US 12,054,624 B2
(45) Date of Patent: Aug. 6, 2024

(54) INKJET INK FOR IMPERMEABLE BASE MATERIAL, IMAGE RECORDING METHOD, AND METHOD OF PRODUCING LAMINATE

(71) Applicant: FUJIFILM Corporation, Tokyo (JP)

(72) Inventors: Ayato Sato, Kanagawa (JP); Yusuke Fujii, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 17/464,708

(22) Filed: Sep. 2, 2021

(65) Prior Publication Data

US 2021/0403735 A1 Dec. 30, 2021

Related U.S. Application Data

(63) Continuation of application No. PCT/JP2020/006420, filed on Feb. 19, 2020.

(30) Foreign Application Priority Data

Mar. 28, 2019 (JP) ................. 2019-064599

(51) Int. Cl.
*B41J 2/01* (2006.01)
*B41M 5/00* (2006.01)
*C09D 11/322* (2014.01)

(52) U.S. Cl.
CPC ............... *C09D 11/322* (2013.01); *B41J 2/01* (2013.01); *B41M 5/00* (2013.01)

(58) Field of Classification Search
CPC .......... B41J 2/01; B05D 1/26; B05D 2401/21; B05D 2601/02; B41M 5/00; B41M 5/0023; C09D 11/322; C09D 11/326; C09D 11/38

See application file for complete search history.

(56) References Cited

U.S. PATENT DOCUMENTS

| | | | |
|---|---|---|---|
| 9,127,178 B2 | 9/2015 | Cordwell et al. | |
| 9,487,667 B2 | 11/2016 | Ohta | |
| 10,975,257 B2* | 4/2021 | Kiyoto | C09D 11/322 |
| 11,072,719 B2 | 7/2021 | Eguchi et al. | |
| 2002/0077384 A1 | 6/2002 | Sano et al. | |
| 2004/0242726 A1 | 12/2004 | Waki et al. | |
| 2006/0092248 A1 | 5/2006 | Taguchi et al. | |
| 2010/0034973 A1 | 2/2010 | Ohya et al. | |
| 2011/0242199 A1* | 10/2011 | Nishimura | C09D 11/322 |
| | | | 524/502 |
| 2012/0218342 A1* | 8/2012 | Ikeda | C09D 11/38 |
| | | | 524/424 |
| 2012/0268519 A1 | 10/2012 | Ohya et al. | |
| 2013/0286119 A1 | 10/2013 | Cordwell et al. | |
| 2016/0264805 A1* | 9/2016 | Nagase | C09D 11/36 |
| 2019/0185691 A1 | 6/2019 | Takeshita et al. | |

FOREIGN PATENT DOCUMENTS

| | | |
|---|---|---|
| CN | 1628158 | 6/2005 |
| CN | 101617004 | 12/2009 |
| CN | 101716852 | 6/2010 |
| CN | 103443217 | 12/2013 |
| EP | 3275949 | 1/2018 |
| EP | 3904474 | 11/2021 |
| EP | 3904476 | 11/2021 |
| JP | H09249821 | 9/1997 |
| JP | 2013193252 | 9/2013 |
| JP | 2013216862 | 10/2013 |
| JP | 2014507305 | 3/2014 |
| JP | 2018080255 | 5/2018 |
| JP | 2019038874 | 3/2019 |
| WO | 2010038071 | 4/2010 |
| WO | 2011055595 | 5/2011 |
| WO | 2012085541 | 6/2012 |
| WO | 2016181797 | 11/2016 |
| WO | 2018030485 | 2/2018 |
| WO | 2018062212 | 4/2018 |
| WO | 2020137457 | 7/2020 |
| WO | 2020137464 | 7/2020 |

OTHER PUBLICATIONS

"Search Report of Europe Counterpart Application", issued on Apr. 22, 2022, p. 1-p. 7.
"International Search Report (Form PCT/ISA/210) of PCT/JP2020/006420," mailed on Apr. 21, 2020, with English translation thereof, pp. 1-5.
"Written Opinion of the International Searching Authority (Form PCT/ISA/237)" of PCT/JP2020/006420, mailed on Apr. 21, 2020, with English translation thereof, pp. 1-8.
"Office Action of Japan Counterpart Application" with English translation thereof, issued on Jun. 21, 2022, p. 1-p. 7.
Office Action of China Counterpart Application, with English translation thereof, issued on Dec. 26, 2022, pp. 1-14.
"Office Action of China Counterpart Application", issued on Jun. 7, 2023, with English translation thereof, pp. 1-23.
Xie Qi Zhong, "Microcomputer Active Peripheral," Huazhong University of science & technology press, Oct. 2001, pp. 1-3.
"Office Action of China Counterpart Application" with English translation thereof, issued on Jun. 1, 2022, p. 1-p. 15.
"Office Action of Europe Counterpart Application", issued on Nov. 3, 2023, pp. 1-4.

* cited by examiner

*Primary Examiner* — Anh T Vo
(74) *Attorney, Agent, or Firm* — JCIPRNET

(57) ABSTRACT

An inkjet ink for an impermeable base material includes water, a resin-coated pigment in which at least a part of the pigment is coated with a crosslinked resin, a solvent A which is an alkanediol compound having a boiling point of 180° C. to 200° C., and a solvent B which is at least one of a monoalcohol compound having a boiling point of 70° C. to 160° C. or a glycol monoether compound having a boiling point of 70° C. to 160° C. An image recording method includes applying of the inkjet ink for an impermeable base material to record an image.

7 Claims, No Drawings

INKJET INK FOR IMPERMEABLE BASE MATERIAL, IMAGE RECORDING METHOD, AND METHOD OF PRODUCING LAMINATE

CROSS-REFERENCE TO RELATED APPLICATIONS

This application is a Continuation of PCT International Application No. PCT/JP2020/006420, filed on Feb. 19, 2020, which claims priority under 35 U.S.C. § 119(a) to Japanese Patent Application No. 2019-064599, filed on Mar. 28, 2019. Each of the above application(s) is hereby expressly incorporated by reference, in its entirety, into the present application.

BACKGROUND OF THE INVENTION

1. Field of the Invention

The present disclosure relates to an inkjet ink for an impermeable base material, an image recording method, and a method of producing a laminate.

2. Description of the Related Art

In the related art, various examinations have been conducted on inks used for recording images.

For example, JP2013-216862A discloses, as an aqueous inkjet ink that has high water resistance with respect to a highly hydrophobic and poorly absorbable base material such as coated paper, art paper, or a polyvinyl chloride sheet and excellent jetting stability from an ink jetting nozzle, preservation stability, and coated film resistance, an aqueous inkjet ink containing at least water, a pigment, water-dispersible resin fine particles as a binder resin, and a water-soluble organic solvent, in which the total amount of the water-soluble organic solvent in the ink composition is 15% by weight or greater and 45% by weight or less, at least one kind in the water-soluble organic solvent is alkanediol compounds having 4 or more carbon atoms and a boiling point of 180° C. or higher and 230° C. or lower, at least one kind therein is (poly)propylene glycol alkyl ethers having a boiling point of 100° C. or higher and 180° C. or lower, and in a case where the content of the alkanediol compounds in the aqueous ink composition is defined as A, the content of the (poly)propylene glycol alkyl ethers in the aqueous ink composition is defined as B, and the total amount of the water-soluble organic solvent in the aqueous ink composition is defined as C, the relationship of "60%≤(A+B)/C≤100%" and the relationship of "50%≤A/B≤350%" are satisfied.

Further, JP2018-80255A discloses, as an aqueous ink capable of improving scratch resistance, water resistance, solvent resistance, and the fixing property to a recording medium at an extremely high level in a well-balanced manner in a case of performing recording on a non-absorbable recording medium while long-term preservation stability and jetting stability in a case of ink jet recording are maintained, an aqueous ink containing water-insoluble polymer particles A that contain a pigment, water-insoluble polymer particles B that do not contain a pigment, an organic solvent C, and water, in which the water-insoluble polymer particles A that contain a pigment are formed by being crosslinked by a water-insoluble polymer P1 and a water-insoluble polyfunctional epoxy compound, the water-insoluble polymer particles B are one or more kinds selected from water-insoluble vinyl-based polymer particles, water-insoluble polyester resin particles, and water-insoluble polyurethane resin particles, the average particle diameter of the water-insoluble polymer particles A that contain a pigment is 80 nm or greater and 150 nm or less, the average particle diameter of the water-insoluble polymer particles B is 20 nm or greater and 75 nm or less, the organic solvent C contains alkylene glycol and alkylene glycol ether, the total content of the alkylene glycol and the alkylene glycol ether in the organic solvent C is 60% by mass or greater, the content of the organic solvent having a boiling point of 250° C. or lower is 90% by mass or greater, and the content of water in the aqueous ink is 42% by mass or greater.

SUMMARY OF THE INVENTION

In a case where an image is recorded by applying an ink onto an impermeable base material, it may be required to further improve the drying properties of the image (that is, the ink applied to the base material). Further, a base material for lamination may be laminated on an image after the image is recorded on an impermeable base material. In this case, improvement of the lamination strength between the image and the base material for lamination may be required. Further, in a case where the drying properties of the image and the lamination strength between the image and the base material for lamination are ensured, jetting of the ink is paused, and the ink is allowed to be jetted again, it may be required to ensure the jettability (hereinafter, also referred to as "re-jettability after jetting pause" or simply referred to as "re-jettability").

An object of the present disclosure is to provide an inkjet ink for an impermeable base material and an image recording method which enable recording of an image with excellent drying properties and excellent lamination strength between a base material for lamination and the image on an impermeable base material and further have excellent re-jettability after jetting pause.

Specific means for achieving the above-described objects includes the following aspects.

<1> An inkjet ink for an impermeable base material, comprising: water; a resin-coated pigment in which at least a part of the pigment is coated with a crosslinked resin; a solvent A which is an alkanediol compound having a boiling point of 180° C. to 200° C.; and a solvent B which is at least one of a monoalcohol compound having a boiling point of 70° C. to 160° C. or a glycol monoether compound having a boiling point of 70° C. to 160° C.

<2> The inkjet ink for an impermeable base material according to <1>, further comprising: a resin component which is at least one of resin particles or a water-soluble resin.

<3> The inkjet ink for an impermeable base material according to <2>, in which the resin component includes the resin particles.

<4> The inkjet ink for an impermeable base material according to <2> or <3>, in which a value obtained by subtracting an SP value of the resin component from an average SP value of the solvent A and the solvent B is 8.0 MPa$^{1/2}$ or greater.

<5> The inkjet ink for an impermeable base material according to any one of <1> to <4>, in which a value obtained by dividing an acid value of the crosslinked resin in a unit of mgKOH/g by a content of the solvent B in a unit of % by mass with respect to a total amount of the inkjet ink for an impermeable base material is in a range of 7 to 15.

<6> The inkjet ink for an impermeable base material according to any one of <1> to <5>, in which the solvent B includes at least one of a monoalcohol compound having a boiling point of 70° C. to 140° C. or a glycol monoether compound having a boiling point of 70° C. to 140° C.

<7> The inkjet ink for an impermeable base material according to any one of <1> to <6>, in which a content of the solvent B is in a range of 5% by mass to 10% by mass with respect to a total amount of the inkjet ink for an impermeable base material.

<8> An image recording method comprising: applying the inkjet ink for an impermeable base material according to any one of <1> to <7> onto an impermeable base material using an ink jet method to record an image.

<9> A method of producing a laminate, comprising: obtaining an image recorded material which includes the impermeable base material and the image disposed on the impermeable base material using the image recording method according to <8>; and laminating a base material for lamination on the image recorded material on a side where the image is disposed.

According to the present disclosure, it is possible to provide an inkjet ink for an impermeable base material and an image recording method which enable recording of an image with excellent drying properties and excellent lamination strength between a base material for lamination and the image on an impermeable base material and further have excellent re-jettability after jetting pause.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition is present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the "inkjet ink for an impermeable base material" indicates an inkjet ink used for recording of an image on an impermeable base material.

Further, in the present disclosure, the "image" indicates an entire film to be formed using an inkjet ink for an impermeable base material, and the "recording of an image" and the "image recording" respectively indicate formation of a film and film formation.

Further, the concept of "image" in the present disclosure also includes a solid image.

[Inkjet Ink for Impermeable Base Material]

The inkjet ink for an impermeable base material (hereinafter, also simply referred to as an "ink") of the present disclosure contains water; a resin-coated pigment in which at least a part of the pigment is coated with a crosslinked resin; a solvent A which is an alkanediol compound having a boiling point of 180° C. to 200° C.; and a solvent B which is at least one of a monoalcohol compound having a boiling point of 70° C. to 160° C. or a glycol monoether compound having a boiling point of 70° C. to 160° C.

According to the ink of the present disclosure, an image having excellent drying properties and excellent lamination strength between a base material for lamination and the image can be recorded on an impermeable base material. The ink of the present disclosure also has excellent re-jettability after jetting pause.

The ink of the present disclosure is an ink having satisfactory drying properties of an image and lamination strength between a base material for lamination and the image, which may be required for image recording on an impermeable base material.

The reason why the above-described effects of the drying properties, the lamination strength, and the re-jettability after jetting pause are exhibited in the ink of the present disclosure is assumed as follows. However, the ink of the present disclosure is not limited to the following reason.

The fact that the boiling point of the solvent A having a higher boiling point between the solvent A and the solvent B in the ink is 200° C. or lower is considered to contribute to the effect of the drying properties of the image.

The resin-coated pigment in which at least a part of the pigment is coated with a crosslinked resin and the solvent B having a relatively lower boiling point (specifically, a boiling point of 70° C. to 160° C.) is considered to contribute to the effect of the lamination strength between the image and the base material for lamination (hereinafter, also simply referred to as the "lamination strength of an image").

Specifically, it is considered that since the resin in the resin-coated pigment is crosslinked and the boiling point of the solvent B is relatively low, the resin-coated pigment is uniformly dispersed in a case of application of the ink onto the impermeable base material so that an ink film (that is, an image) in which remaining of solvent components is suppressed is formed.

The uniform dispersion of the resin-coated pigment and the suppression of remaining of solvent components in the image are considered to contribute to improvement of the lamination strength between the image and the base material for lamination.

The resin-coated pigment in which at least a part of the pigment is coated with the crosslinked resin and the solvent A which is an alkanediol compound having a boiling point of 180° C. to 200° C. are considered to contribute to the effect of the re-jettability after jetting pause.

Specifically, it is considered that in a case where a resin-coated pigment in which at least a part of the pigment is coated with an uncrosslinked resin and an ink which contains an organic solvent having a boiling point of 180° C. to 200° C. are used, and water evaporates from the ink in the vicinity of an outlet of a nozzle (jet hole) of an ink jet head during the ink jetting pause to form a composition rich in the organic solvent, the resin may be separated from the pigment to cause thickening of the ink due to the interaction between the resin-coated pigment and the organic solvent having a boiling point of 180° C. to 200° in the ink in the vicinity of the outlet. It is considered that the re jettability after jetting pause may be degraded due to the thickening of the ink in the vicinity of the outlet (see Comparative Examples 3 to 5 described below).

In the ink of the present disclosure, it is considered that since the resin-coated pigment is crosslinked and the organic solvent having a boiling point of 180° C. to 200° C. is an alkanediol compound having a relatively high hydrophilicity (that is, an SP value), the separation of the resin from the pigment and the thickening of the ink in the ink in the vicinity of the outlet are suppressed, and thus deterioration of re jettability is suppressed.

Further, it is considered that in a case where the ink does not contain an organic solvent having a boiling point of 180° C. or higher, a dried product of the ink is likely to remain in the vicinity of the outlet of a nozzle, and the re jettability of the ink may be deteriorated due to the dried product (see Comparative Example 2 described below).

In the ink of the present disclosure, it is considered that since the ink contains an alkanediol compound having a boiling point of 180° C. to 200° C., remaining of the dried product of the ink on a nozzle surface is suppressed, and as a result, the jettability and the re jettability of the ink caused by the dried product of the ink are also degraded.

Hereinafter, each component that can be contained in the ink of the present disclosure will be described.

<Water>

The ink of the present disclosure contains water (A).

That is, the ink of the present disclosure is a so-called aqueous ink.

The content of water is preferably 50% by mass or greater and more preferably 60% by mass or greater with respect to the total amount of the ink.

The upper limit of the content of water with respect to the total amount of the ink is appropriately determined according to the content of other components. The upper limit of the content of water with respect to the total amount of the ink may be 90% by mass, 80% by mass, or the like.

<Resin-Coated Pigment in which at Least Part of Pigment is Coated with Crosslinked Resin>

The ink of the present disclosure contains at least one resin-coated pigment (hereinafter, also referred to as a "crosslinked resin-coated pigment") in which at least a part of the pigment is coated with a crosslinked resin.

In this manner, the drying properties and the lamination strength of the image can be improved (particularly due to the crosslinking of the resin).

The crosslinked resin-coated pigment is formed by dispersing a pigment using an uncrosslinked resin (hereinafter, also referred to as an "uncrosslinked resin") as a dispersant to obtain an uncrosslinked resin-coated pigment in which at least a part of the pigment is coated with an uncrosslinked resin, and crosslinking the uncrosslinked resin in the obtained uncrosslinked resin-coated pigment (that is, the uncrosslinked resin used for coating at least a part of the pigment) using a crosslinking agent.

(Pigment)

As the pigment in the crosslinked resin-coated pigment, organic pigments and inorganic pigments known in the field of ink can be used without particular limitation.

Examples of the pigment include a polycyclic pigment such as an azo lake pigment, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment; an organic pigment such as a nitro pigment, a nitroso pigment, aniline black, or a daylight fluorescent pigment; and an inorganic pigment such as titanium oxide, iron oxide, or carbon black.

Among the pigments, an azo pigment, a phthalocyanine pigment, an anthraquinone pigment, a quinacridone pigment, and a carbon black pigment are preferable.

The pigments may refer to the description in known documents such as JP5404669B as appropriate.

The pigment concentration (that is, the content of the pigment with respect to the total amount of the ink) in the ink of the present disclosure is preferably in a range of 1% by mass to 20% by mass, more preferably in a range of 1% by mass to 15% by mass, and still more preferably in a range of 1% by mass to 10% by mass.

(Crosslinked Resin and Uncrosslinked Resin)

The crosslinked resin in the crosslinked resin-coated pigment is formed by crosslinking an uncrosslinked resin.

As the uncrosslinked resin, a water-soluble resin is preferable.

That is, a crosslinked water-soluble resin is preferable as the crosslinked resin in the crosslinked resin-coated pigment.

In the present disclosure, the term "water-soluble" indicates a property in which 1 g or greater of a substance is dissolved in 100 g of water at 25° C.

As the "water-soluble" property, a property in which 3 g or greater (more preferably 10 g or greater) of a substance is dissolved in 100 g of water at 25° C. is preferable.

Further, it goes without saying that the uncrosslinked water-soluble resin has water solubility, but the "crosslinked water-soluble resin" does not necessarily need to have water solubility.

Examples of the uncrosslinked water-soluble resin include polyvinyls, polyurethanes, and polyesters. Among these, polyvinyls are preferable.

As the uncrosslinked water-soluble resin, a water-soluble resin containing a functional group that can be crosslinked by a crosslinking agent is preferable.

Examples of the crosslinkable functional group include a carboxy group or a salt thereof, an isocyanate group, and an epoxy group. From the viewpoint of improving the dispersibility, a carboxy group or a salt thereof is preferable, and a carboxy group is particularly preferable.

As the water-soluble resin containing a carboxy group, which is a preferred embodiment of the uncrosslinked water-soluble resin, a copolymer having a structural unit (that is, a structural unit formed by polymerizing a carboxy group-containing monomer) derived from a carboxy group-containing monomer is more preferable.

The structural unit derived from a carboxy group-containing monomer contained in a copolymer may be used alone or two or more kinds thereof.

Examples of the carboxy group-containing monomer include (meth)acrylic acid, β-carboxyethyl acrylate, fumaric acid, itaconic acid, maleic acid, and crotonic acid.

From the viewpoints of the crosslinkability and the dispersion stability, as the carboxy group-containing monomer, (meth)acrylic acid or β-carboxyethyl acrylate is preferable, and (meth)acrylic acid is more preferable.

Here, the concept of (meth)acrylic acid includes acrylic acid and methacrylic acid.

It is preferable that the copolymer having a structural unit derived from a carboxy group-containing monomer further has a structural unit (that is, a structural unit formed by polymerizing a hydrophobic monomer) derived from a hydrophobic monomer.

In this case, the structural unit derived from a hydrophobic monomer contained in a copolymer may be used alone or two or more kinds thereof.

Examples of the hydrophobic monomer include (meth)acrylate containing an alkyl group having 1 to 20 carbon atoms, (meth)acrylate containing an aromatic ring group (such as benzyl (meth)acrylate or phenoxyethyl (meth)acrylate), styrene, and a styrene derivative.

The method of synthesizing a copolymer is not particularly limited, but a method of randomly copolymerizing vinyl monomers is preferable from the viewpoint of the dispersion stability.

As the water-soluble resin containing a carboxy group, which is a preferred embodiment of the uncrosslinked resin, a copolymer having a structural unit derived from a carboxy group-containing monomer and at least one of a structural unit derived from (meth)acrylate containing an alkyl group having 1 to 20 carbon atoms or a structural unit derived from (meth)acrylate containing an aromatic ring group is preferable, a copolymer having a structural unit derived from (meth)acrylic acid and a structural unit derived from (meth)acrylate containing an aromatic ring group is more preferable, and a copolymer having a structural unit derived from (meth)acrylic acid and a structural unit derived from benzyl (meth)acrylate is still more preferable.

In the present disclosure, the structural unit derived from a carboxy group-containing monomer indicates a structural unit formed by polymerizing a carboxy group-containing monomer (the same applies to other structural units).

In the present disclosure, the structural unit derived from a carboxy group-containing monomer may be referred to as a carboxy group-containing monomer unit. The same applies to other structural units.

The content of the carboxy group-containing monomer unit in the water-soluble resin containing a carboxy group is preferably in a range of 5% by mass to 40% by mass, more preferably in a range of 10% by mass to 35% by mass, and still more preferably in a range of 10% by mass to 30% by mass with respect to the total amount of the water-soluble resin containing a carboxy group.

The preferable ranges of the content of the carboxy group-containing monomer unit in the crosslinked resin are the same as the preferable ranges of the content of the carboxy group-containing monomer unit in the water-soluble resin containing a carboxy group.

The total content of the (meth)acrylate unit containing an alkyl group having 1 to 20 carbon atoms and the (meth)acrylate unit containing an aromatic ring group in the water-soluble resin containing a carboxy group is preferably in a range of 60% by mass to 95% by mass, more preferably in a range of 70% by mass to 90% by mass, and still more preferably in a range of 75% by mass to 90% by mass with respect to the total amount of the water-soluble resin containing a carboxy group.

The preferable ranges of the total content of the (meth)acrylate unit containing an alkyl group having 1 to 20 carbon atoms and the (meth)acrylate unit containing an aromatic ring group in the crosslinked resin are also the same as the preferable ranges of the total content of the (meth)acrylate unit containing an alkyl group having 1 to 20 carbon atoms and the (meth)acrylate unit containing an aromatic ring group in the water-soluble resin containing a carboxy group.

The content of the (meth)acrylate unit containing an aromatic ring group in the water-soluble resin containing a carboxy group is preferably in a range of 60% by mass to 95% by mass, more preferably in a range of 70% by mass to 90% by mass, and still more preferably in a range of 75% by mass to 90% by mass with respect to the total amount of the water-soluble resin containing a carboxy group.

The preferable ranges of the content of the (meth)acrylate unit containing an aromatic ring group in the crosslinked resin are the same as the preferable ranges of the total content of the (meth)acrylate unit containing an aromatic ring group in the water-soluble resin containing a carboxy group.

From the viewpoint of the dispersibility of the pigment, the acid value of the uncrosslinked resin is preferably in a range of 67 mgKOH/g to 200 mgKOH/g and more preferably in a range of 67 mgKOH/g to 150 mgKOH/g.

Further, from the viewpoint of the dispersibility of the pigment, the acid value of the crosslinked resin is preferably in a range of 55 to 100 mgKOH/g.

The weight-average molecular weight (Mw) of the uncrosslinked resin is not particularly limited, but is preferably in a range of 3000 to 100000, more preferably in a range of 5000 to 80000, and still more preferably in a range of 10000 to 60000 from the viewpoint of the dispersibility of the pigment.

The preferable ranges of the weight-average molecular weight of the crosslinked resin are the same as the preferable ranges of the weight-average molecular weight of the uncrosslinked resin.

In the present disclosure, the weight-average molecular weight (Mw) is measured by gel permeation chromatography (GPC). The measurement according to GPC is performed by connecting three columns of TSKgeL Super HZM-H, TSKgeL Super HZ4000, and TSKgel Super HZ2000 (all trade names, manufactured by Tosoh Corporation) in series using HLC-8220GPC (manufactured by Tosoh Corporation) and tetrahydrofuran (THF) as an eluent. Further, the measurement is performed under conditions of a sample concentration of 0.45% by mass, a flow rate of 0.35 ml/min, a sample injection volume of 10 µl, and a measurement temperature of 40° C. using a differential refractive index detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

(Crosslinking Agent)

As the crosslinked resin, a resin crosslinked by a crosslinking agent is preferable.

The resin crosslinked by a crosslinking agent is formed by crosslinking an uncrosslinked resin using a crosslinking agent.

In the formation of the crosslinked resin, only one or two or more kinds of crosslinking agents may be used.

As the crosslinking agent, a compound having two or more reaction sites with an uncrosslinked resin (for example, a water-soluble resin containing a carboxy group) is preferable.

As a combination of the crosslinking agent and the uncrosslinked resin, a combination of a compound containing two or more epoxy groups (that is, a bifunctional or higher functional epoxy compound) as the crosslinking agent and the above-described water-soluble resin containing a carboxy group as the uncrosslinked resin is preferable. In this combination, a crosslinked structure is formed by the reaction of the carboxy group in the water-soluble resin containing a carboxy group with the epoxy group in the compound containing two or more epoxy groups, and thus a crosslinked resin is formed. It is preferable that the formation of such a crosslinked structure is carried out after dispersion of the pigment using the water-soluble resin containing a carboxy group (that is, after formation of the uncrosslinked resin-coated pigment).

Specific examples of the bifunctional or higher functional epoxy compound which is a preferred embodiment of the crosslinking agent include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable.

As the crosslinking agent, a commercially available product can also be used.

Examples of the commercially available product include Denacol EX-321, EX-821, EX-830, EX-850, and EX-851 (manufactured by Nagase ChemteX Corporation).

From the viewpoints of the crosslinking reaction rate and/or the stability of the dispersion liquid after crosslinking, the molar ratio of the crosslinked site (for example, an epoxy group) in the crosslinking agent to the site to be crosslinked (for example, a carboxy group) in the uncrosslinked resin [crosslinked site (for example, an epoxy group) in crosslinking agent:site to be crosslinked (for example, a carboxy group) in uncrosslinked resin] is preferably in a range of 1:1.1 to 1:10, more preferably in a range of 1:1.1 to 1:5, and still more preferably in a range of 1:1.1 to 1:3.

Further, the mass ratio of the pigment to the crosslinked resin (hereinafter, the mass ratio [pigment/crosslinked resin]) in the crosslinked resin-coated pigment is preferably in a range of 0.1 to 1.5 and more preferably in a range of 0.2 to 1.0.

The volume average particle diameter of the crosslinked resin-coated pigment is preferably in a range of 10 nm to 200 nm, more preferably in a range of 10 nm to 150 nm, still more preferably in a range of 40 nm to 150 nm, and even still more preferably in a range of 50 nm to 150 nm.

In the present disclosure, the volume average particle diameter indicates a value acquired by a dynamic light scattering method.

The volume average particle diameter is measured using, for example, a NANOTRAC particle size distribution measurement apparatus UPA-EX150 (manufactured by Nikkiso Co., Ltd.).

The content of the crosslinked resin-coated pigment in the ink of the present disclosure is preferably in a range of 1.5% by mass to 25% by mass, more preferably in a range of 2% by mass to 20% by mass, and still more preferably in a range of 2% by mass to 15% by mass with respect to the total amount of the ink.

<Solvent A>

The ink of the present disclosure contains the solvent A which is an alkanediol compound having a boiling point of 180° C. to 200° C.

The solvent A mainly contributes to the improvement of the re-jettability of the ink after jetting pause.

Specifically, in a case where the boiling point of the solvent A is 180° C. or higher, the re-jettability of the ink after jetting pause can be improved.

In a case where the boiling point of the solvent A is 200° C. or lower, the drying properties of the image can be improved.

Since the solvent A is an alkanediol compound, the re-jettability of the ink after jetting pause can be improved.

The ink of the present disclosure may contain only one or two or more kinds of solvents A.

In the present disclosure, the "boiling point" indicates a boiling point at 1 atm (101325 Pa).

Examples of the solvent A include ethylene glycol (see examples described below for the boiling point), propylene glycol (see examples described below for the boiling point), 1,2-butanediol (see examples described below for the boiling point), and 2-methyl-2,4-pentanediol (boiling point of 197° C.)).

Further, the SP value of the solvent A is not particularly limited.

The SP value of the solvent A is, for example, in a range of 25.0 to 50.0 and preferably in a range of 30.0 to 45.0.

In the present disclosure, the "SP value" indicates the SP value in the unit of $MPa^{1/2}$.

The SP value in the present disclosure is a value calculated by the Okitsu method ("Journal of the Adhesion Society of Japan", written by Toshinao Okitsu, 29(5) (1993)).

Specifically, the SP value is calculated by the following equation. Further, ΔF is a value described in the literatures.

$$SP\ value(\delta) = \Sigma\Delta F(\text{Molar Attraction Constants})/V(\text{molar volume})$$

The content of the solvent A in the ink of the present disclosure (the total content in a case where the ink contains two or more kinds of solvents A, the same applies hereinafter) is preferably in a range of 5% by mass to 40% by mass, more preferably in a range of 10% by mass to 30% by mass, and still more preferably in a range of 15% by mass to 25% by mass.

<Solvent B>

The ink of the present disclosure contains a solvent B which is at least one of a monoalcohol compound having a boiling point of 70° C. to 160° C. or a glycol monoether compound having a boiling point of 70° C. to 160° C.

The solvent B mainly improves the drying properties and the lamination strength of the image.

Specifically, since the solvent B is at least one of a monoalcohol compound having a boiling point of 160° C. or lower or a glycol monoether compound having a boiling point of 160° C. or lower, the drying properties and the lamination strength of the image can be improved.

The fact that the solvent B is at least one of a monoalcohol compound having a boiling point of 70° C. or higher or a glycol monoether compound having a boiling point of 70° C. or higher is advantageous in terms of the jettability and the re-jettability of the ink.

The fact that the solvent B is at least one of a monoalcohol compound or a glycol monoether compound is advantageous in terms of the jettability and the re-jettability of the ink.

The ink of the present disclosure may contain only one or two or more kinds of solvents B.

In a case where the ink of the present disclosure contains two or more kinds of solvents B, the ink of the present disclosure may contain two or more kinds of monoalcohol compounds, two or more kinds of glycol monoether compounds, or one or more kinds of monoalcohol compounds and one or more kinds of glycol monoether compounds.

Examples of the solvent B which is a monoalcohol compound having a boiling point of 70° C. to 160° C. include ethanol (see examples described below for the boiling point), 1-propanol (boiling point of 97° C.), 2-propanol (see examples described below for the boiling point), 1-butanol (see examples described below for the boiling point), 2-butanol (boiling point of 99° C.), 1-pentanol (boiling point of 138° C.), 3-methyl-1-butanol (boiling point of 132° C.), 2-methyl-1-butanol (boiling point of 108° C.), 1-hexanol (boiling point of 157° C.), and 2-methyl-1-pentanol (boiling point of 148° C.).

Examples of the solvent B which is a glycol ether compound having a boiling point of 70° C. to 160° C. include 3-methoxy-1-butanol (see examples described below for the boiling point), ethylene glycol monomethyl ether (see examples described below for the boiling point), ethylene glycol monoethyl ether (see examples described below for the boiling point), ethylene glycol monopropyl ether (boiling point of 150° C.), ethylene glycol monoisopropyl ether (boiling point of 141° C.), ethylene glycol monoisobutyl ether (boiling point of 160° C.), propylene glycol monomethyl ether (see examples described below for the boiling point), propylene glycol monoethyl ether (see examples described below for the boiling point), and propylene glycol monopropyl ether (see examples described below for the boiling point).

From the viewpoint of improving the drying properties and the lamination strength of the image, it is preferable that the solvent B contains at least one of a monoalcohol compound having a boiling point of 70° C. to 140° C. or a glycol monoether compound having a boiling point of 70° C. to 140° C.

In this case, the total content of the monoalcohol compound having a boiling point of 70° C. to 140° C. and the glycol monoether compound having a boiling point of 70° C. to 140° C. is preferably in a range of 50% by mass to 100% by mass, more preferably in a range of 60% by mass to 100% by mass, and still more preferably in a range of 80% by mass to 100% by mass with respect to the total content of the solvent B.

Further, the SP value of the solvent B is not particularly limited.

The SP value of the solvent B is, for example, in a range of 15.0 to 35.0 and preferably in a range of 20.0 to 30.0.

The content of the solvent B in the ink of the present disclosure (the total content in a case where the ink contains two or more kinds of solvents B, the same applies hereinafter) is preferably in a range of 2% by mass to 15% by mass, more preferably in a range of 3% by mass to 12% by mass, and still more preferably in a range of 5% by mass to 10% by mass.

In a case where the content of the solvent B is 2% by mass or greater, the drying properties and the lamination strength of the image are further improved.

In a case where the content of the solvent B is 15% by mass or less, the jettability and the re-jettability of the ink are further improved.

Further, in the ink of the present disclosure, the value obtained by dividing the acid value of the crosslinked resin in the unit of mgKOH/g by the content of the solvent B in the unit of % by mass with respect to the total amount of the ink (hereinafter, also referred to as the "ratio of acid value/amount of solvent B") is preferably in a range of 5 to 20 and more preferably in a range of 7 to 15.

In a case where the ratio of acid value/amount of solvent B is 5 or greater, the jettability and the re jettability of the ink are further improved.

In a case where the ratio of acid value/amount of solvent B is 20 or less, the drying properties and the lamination strength of the image are further improved.

<Other Organic Solvents>

The ink of the present disclosure may contain organic solvents other than the solvent A and the solvent B.

From the viewpoint of more effectively obtaining the effects of the ink of the present disclosure, the total proportion of the solvent A and the solvent B in all the organic solvents in the ink of the present disclosure is preferably in a range of 60% by mass to 100% by mass, more preferably in a range of 80% by mass to 100% by mass, and still more preferably in a range of 90% by mass to 100% by mass.

From the viewpoint of further improving the drying properties and the lamination strength of the image, it is preferable that the ink of the present disclosure does not contain an organic solvent having a boiling point of higher than 200° C. or the content of the organic solvent having a boiling point of higher than 200° C. is preferably less than 2% by mass (more preferably less than 1% by mass) with respect to the total amount of the ink in a case where the ink of the present disclosure contains an organic solvent having a boiling point of higher than 200° C.

<Resin Component>

It is preferable that the ink of the present disclosure contains at least one resin component which is at least one of resin particles or a water-soluble resin.

The resin component here indicates a resin component other than the resin used for coating the pigment in the resin-coated pigment.

In a case where the ink of the present disclosure contains a resin component, the lamination strength of the image is further improved.

The reason for this is considered to be that since the ink contains a resin component, the film-forming property of the ink applied onto the impermeable base material is enhanced, and thus an ink film is more easily formed. Specifically, the reason is considered to be that the action of the solvent B promotes formation of an ink film (that is, an image) containing a resin component in which remaining of a solvent component is suppressed, and such an image exhibits excellent lamination strength.

The kind of resin in the resin component is not particularly limited.

Examples of the resin in the resin component include an acrylic resin, a polyester resin, a urethane resin, and an olefin resin.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

Further, in the present disclosure, the urethane resin indicates a polymer compound having a urethane bond in the main chain.

Further, in the present disclosure, the olefin resin indicates a polymer (a homopolymer or a copolymer) of a raw material monomer containing an olefin. Examples of the olefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

The weight-average molecular weight (Mw) of the resin in the resin component is preferably in a range of 3000 to 500000, more preferably in a range of 3000 to 200000, still more preferably in a range of 3000 to 100000, even still more preferably in a range of 5000 to 80000, and even still more preferably in a range of 8000 to 60000.

The weight-average molecular weight (Mw) of the acrylic resin as the resin in the resin component is preferably in a range of 3000 to 100000, more preferably in a range of 5000 to 80000, and still more preferably in a range of 8000 to 60000.

The weight-average molecular weight (Mw) of the polyester resin as the resin in the resin component is preferably in a range of 3000 to 200000, more preferably in a range of 4000 to 150000, and still more preferably in a range of 5000 to 100000.

The weight-average molecular weight (Mw) of the urethane resin as the resin in the resin component is preferably in a range of 3000 to 500000, more preferably in a range of 4000 to 300000, and still more preferably in a range of 5000 to 200000.

The weight-average molecular weight (Mw) of the olefin resin as the resin in the resin component is preferably in a range of 3000 to 100000, more preferably in a range of 3000 to 50000, and still more preferably in a range of 7000 to 20000.

As described above, the resin component is at least one of resin particles or a water-soluble resin.

As the water-soluble resin as the resin component, the same water-soluble resin as the uncrosslinked resin described above may be used.

It is preferable that the resin component contains resin particles.

In this manner, the jettability and the re-jettability of the ink are further improved.

In a case where the resin component contains resin particles, the proportion of the resin particles in the resin component is preferably greater than 50% by mass and 100% by mass or less, more preferably in a range of 60% by mass to 100% by mass, and still more preferably in a range of 80% by mass to 100% by mass.

The resin particles may contain one or two or more kinds of resins.

It is preferable that the resin contained in the resin particles is a water-insoluble resin.

In the present disclosure, the term "water-insoluble" in a water-insoluble resin indicates a property that the amount of a substance to be dissolved in 100 g of water at 25° C. is less than 1.0 g (more preferably less than 0.5 g).

From the viewpoint of further improving the adhesiveness and the rub resistance of the image, it is preferable that the resin particles which can be contained in the ink include acrylic resin particles.

In a case where the resin particles which can be contained in the ink include acrylic resin particles, the proportion of the acrylic resin particles in the resin particles contained in the ink is preferably 60% by mass or greater, more preferably 80% by mass or greater, and still more preferably 90% by mass or greater.

In a case where the proportion of the acrylic resin particles in the resin particles which can be contained in the ink is 60% by mass or greater, the adhesiveness of the image is further improved.

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering particle size distribution analyzer.

As a measuring device, a particle size distribution measuring device "MICROTRAC MT-3300II" (manufactured by Nikkiso Co., Ltd.) is exemplified.

In regard to the resin particles, for example, as an example of particles formed of an acrylic resin, the description in paragraphs 0137 to 0171 of WO2017/163738A and the description in paragraphs 0036 to 0081 of JP2010-077218A may be referred to.

From the viewpoint of improving the adhesiveness of an image to be obtained, the glass transition temperature (Tg) of the resin contained in the resin particles is preferably 100° C. or lower and more preferably 75° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the resin particles contain two or more kinds of resins, the glass transition temperature (Tg) of the resin particles indicates the weighted average value of the glass transition temperatures of the respective resins.

The resin contained in the resin particles has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is preferably in a range of 0.001 mol to 1.0 mol and more preferably in a range of 0.01 mol to 0.5 mol, for example, per 100 g of the resin contained in the resin particles.

As the resin in the resin particles, an acrylic resin having at least one selected from the group consisting of a benzyl (meth)acrylate unit, a phenoxyethyl (meth)acrylate unit, and a cyclic aliphatic group-containing (meth)acrylate unit and a (meth)acrylic acid unit is more preferable, and an acrylic resin having at least one selected from the group consisting of a benzyl (meth)acrylate unit, a phenoxyethyl (meth)acrylate unit, and a cyclic aliphatic group-containing (meth)acrylate unit, a (meth)acrylic acid unit, and an alkyl (meth)acrylate unit containing an alkyl group having 1 to 4 carbon atoms is still more preferable.

As the cyclic aliphatic group-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, or dicyclopentanyl (meth)acrylate is preferable, and at least one selected from isobornyl (meth)acrylate, adamantyl (meth)acrylate, or dicyclopentanyl (meth)acrylate is more preferable.

The total content of the benzyl (meth)acrylate unit, the phenoxyethyl (meth)acrylate unit, and the cyclic aliphatic group-containing (meth)acrylate unit in the resin of the resin particles is preferably in a range of 20% by mass to 80% by mass and more preferably in a range of 30% by mass to 75% by mass with respect to the total amount of the resin dispersant.

The total content of the benzyl (meth)acrylate unit, the phenoxyethyl (meth)acrylate unit, the cyclic aliphatic group-containing (meth)acrylate unit, and the alkyl (meth)acrylate unit containing an alkyl group having 1 to 4 carbon atoms in the resin of the resin particles is preferably in a range of 80% by mass to 98% by mass, more preferably in a range of 85% by mass to 97% by mass, and still more preferably in a range of 90% by mass to 95% by mass with respect to the total amount of the resin dispersant.

The content of the (meth)acrylic acid unit in the resin of the resin particles is preferably in a range of 2% by mass to 20% by mass, more preferably in a range of 3% by mass to 15% by mass, and still more preferably in a range of 5% by mass to 10% by mass with respect to the total amount of the resin dispersant.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 3000 to 300000, more preferably in a range of 3000 to 200000, and still more preferably in a range of 5000 to 100000 in terms of the weight-average molecular weight.

The weight-average molecular weight is measured by gel permeation chromatography (GPC). The details of GPC are as described above.

In a case where the ink of the present disclosure contains a resin component (preferably resin particles), the content of the resin component is preferably in a range of 0.5% by mass to 10.0% by mass, more preferably in a range of 1.0% by mass to 8.0% by mass, and still more preferably in a range of 2.5% by mass to 7.0% by mass with respect to the total amount of the ink.

(SP Value of Resin Component)

The SP value of the resin component is not particularly limited, but is preferably in a range of 10.0 to 30.0 and more preferably in a range of 15.0 to 25.0.

In a case where the SP value of the resin component is 30.0 or less, the adhesiveness and the rub resistance (particularly, the rub resistance) of the image are further improved.

In a case where the SP value of the resin component is 10.0 or greater, the range of selection for the resin component is wider.

The SP value of the resin component is acquired by weight-averaging the SP values of the respective structural units constituting the resin component according to the content mass thereof in the resin component.

More specifically, the SP value of the resin component is a value acquired as X by substituting the SP value of an i-type (i represents an integer of 1 or greater) structural unit in the resin component for $S_i$ and substituting the content mass of the i-type structural unit in the resin component for $W_i$ in Mathematical Equation 1.

$$X = \Sigma S_i W_i / \Sigma W_i \quad \text{(Mathematical Equation 1)}$$

As the SP value of the structural unit, the SP value of the compound for forming the structural unit is employed.

For example, the SP value of a resin a formed of a compound A (10% by mass) having an SP value of 15 $MPa^{1/2}$, a compound B (20% by mass) having an SP value of 18 $MPa^{1/2}$, and a compound C (70% by mass) having an SP value of 20 $MPa^{1/2}$ as raw materials is acquired by the following equation.

$$SP \text{ value}(MPa^{1/2}) \text{ of resin} a = (15 \ MPa^{1/2} \times 10 + 18 M^{1/2} \times 20 + 20 \ MPa^{1/2} \times 70)/(10+20+70) = 19.1 \ MPa^{1/2}$$

The structural units in the resin component are identified by thermal analysis gas chromatography.

The analysis of the content mass of the structural units in the resin component is performed by nuclear magnetic resonance (NMR).

In the ink of the present disclosure, the value obtained by subtracting the SP value of the resin component from the average SP value of the solvent A and the solvent B (hereinafter, also referred to as the "difference in SP value [average SP value of solvents A and B-SP value of resin component]") is preferably 7.0 $MPa^{1/2}$ or greater, more preferably 8.0 $MPa^{1/2}$ or greater, and still more preferably 8.5 $MPa^{1/2}$ or greater.

In a case where the difference in SP value [average SP value of solvents A and B-SP value of resin component] is 7.0 $MPa^{1/2}$ or greater, the jettability and the re-jettability of the ink are further improved.

The upper limit of the difference in SP value [average SP value of solvents A and B-SP value of resin component] is not particularly limited, and examples of the upper limit include 15.0, 14.0, and 13.5.

Here, the average SP value of the solvent A and the solvent B indicates the arithmetic average value of the SP value of the solvent A and the SP value of the solvent B.

In a case where a plurality of solvents A is present, the value obtained by arithmetically averaging individual SP values of the plurality of solvents A is defined as the "SP value of the solvent A".

In a case where a plurality of solvents B is present, the value obtained by arithmetically averaging individual SP values of the plurality of solvents A is defined as the "SP value of the solvent B".

<Other Components>

The ink may contain components other than the components described above.

Examples of other components include known additives such as a surfactant, colloidal silica, urea, a urea derivative, a wax, a fading inhibitor, an emulsion stabilizer, a penetration enhancer, an ultraviolet absorbing agent, a preservative, a fungicide, a pH adjuster, a surface tension adjuster, an antifoaming agent, a viscosity adjuster, a dispersion stabilizer, and a chelating agent.

<Preferable Physical Properties of Ink>

The viscosity of the ink of the present disclosure is preferably in a range of 1.2 mPa·s to 15.0 mPa·s, more preferably 2 mPa·s or greater and less than 13 mPa·s, and still more preferably 2.5 mPa·s or greater and less than 10 mPa·s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the ink of the present disclosure is preferably in a range of 25 mN/m to 40 mN/m and more preferably in a range of 27 mN/m to 37 mN/m.

The surface tension is a value measured at a temperature of 25° C.

The surface tension can be measured using, for example, an Automatic Surface Tentiometer CBVP-Z (manufactured by Kyowa Interface Science Co., Ltd.).

From the viewpoint of the dispersion stability, the pH of the ink of the present disclosure at 25° C. is preferably in a range of 6 to 11, more preferably in a range of 7 to 10, and still more preferably in a range of 7 to 9.

The pH of the ink at 25° C. is measured using a commercially available pH meter.

[Image Recording Method]

An image recording method of the present disclosure includes a step of applying the above-described ink of the present disclosure onto an impermeable base material using an ink jet method to record an image (hereinafter, also referred to as an "image recording step").

The image recording method of the present disclosure may include other steps as necessary.

Further, in the image recording step, the ink of the present disclosure is not limited to being directly applied to the surface of the impermeable base material. The ink of the present disclosure may be applied, for example, onto another image recorded on the impermeable base material. Further, the ink of the present disclosure may be applied onto a pretreatment liquid described later, which has been applied onto the impermeable base material.

The image recording method of the present disclosure is an image recording method carried out using the ink of the present disclosure.

Therefore, according to the image recording method of the present disclosure, an image having excellent drying properties and excellent lamination strength between the base material for lamination and the image can be recorded on the impermeable base material. Further, the image recording method of the present disclosure is also excellent in re-jettability of the ink after jetting pause.

<Impermeable Base Material>

In the image recording method of the present disclosure, an impermeable base material is used.

The impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material or a colored resin base material.

Here, the term "transparent" indicates that the transmittance of visible light having a wavelength of 400 nm to 700 nm is 80% or greater (preferably 90% or greater).

The shape of the resin base material is not particularly limited, but a sheet-shaped resin base material is preferable. From the viewpoint of the productivity of a medium to be recorded, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a heat treatment, an abrasion treatment, a light irradiation treatment (UV treatment), and a flame treatment, but the present invention is not limited thereto.

<Image Recording Step>

The method of applying the ink in the image recording step is an ink jet method.

The method of jetting the ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the ink onto the impermeable base material according to the ink jet method can be performed by allowing the ink to be jetted from a nozzle of an ink jet head.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the head and the medium to be recorded are not necessary as compared with the shuttle system, only the medium to be recorded moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different amounts of liquid droplets.

In the image recording step, an image may be obtained by heating and drying the ink which has been applied onto the impermeable base material.

Examples of the means for heating and drying the ink include known heating means such as a heater, known air blowing means such as a dryer, and means for combining these.

Examples of the method for heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is set to be preferably in a range of 20° C. to 50° C. and more preferably in a range of 25° C. to 40° C.

In the image recording step, an image may be formed by applying two or more kinds of inks corresponding to the ink of the present disclosure.

<Step of Applying Treatment Liquid>

The image recording method of the present disclosure may include a step of applying a treatment liquid, which contains an aggregating agent allowing components in the ink to be aggregated, onto the impermeable base material (hereinafter, also referred to as a "treatment liquid adding step") before the image recording step described above.

In this case, in the image recording step, an image is recorded by applying the ink of the present disclosure onto at least a part of the surface of the impermeable base material to which the treatment liquid has been applied.

In a case where the image recording method of the present disclosure includes the first image recording step and the second image recording step described above and also includes the treatment liquid adding step, it is preferable that the treatment liquid adding step, the second image recording step, and the first image recording step are performed in order.

In a case where the image recording method of the present disclosure includes the treatment liquid adding step, the aggregating agent allows the components (for example, the resin (B)) in the ink to be aggregated on the impermeable base material. In this manner, high-speed image recording is realized. Further, the adhesiveness of the image and the rub resistance of the image are further improved.

The application of the treatment liquid onto the impermeable base material can be performed by applying a known method such as a coating method, an ink jet method, or a dipping method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method which can be applied to the image recording step described above.

Further, the impermeable base material may be heated before the application of the treatment liquid in the treatment liquid adding step.

The heating temperature is set such that the temperature of the impermeable base material is preferably in a range of 20° C. to 50° C. and more preferably in a range of 25° C. to 40° C.

In the treatment liquid adding step, the treatment liquid may be heated and dried after the application of the treatment liquid and before the image recording step described above.

Examples of the means for heating and drying the treatment liquid include known heating means such as a heater, known air blowing means such as a dryer, and means for combining these.

Examples of the method of heating and drying the treatment liquid include a method of applying heat from a side of the impermeable base material opposite to the surface to which the treatment liquid has been applied using a heater or the like, a method of applying warm air or hot air to the surface of the impermeable base material to which the treatment liquid has been applied, a method of applying heat from the surface of the impermeable base material to which the treatment liquid has been applied or from a side of the impermeable base material opposite to the surface to which the treatment liquid has been applied using an infrared heater, and a method of combining a plurality of these methods.

The heating temperature the treatment liquid in a case of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

Hereinafter, the details of the treatment liquid used in the image recording method of the present disclosure will be described.

(Treatment Liquid)

The treatment liquid contains an aggregating agent that allows the components in the ink to be aggregated.

It is preferable that the treatment liquid contains at least one selected from the group consisting of a polyvalent metal compound, an organic acid, a metal complex, and a water-soluble cationic polymer as the aggregating agent.

It is preferable that the aggregating agent contains an organic acid.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the treatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the treatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, malonic acid, malic acid, maleic acid, succinic acid, glutaric acid, adipic acid, fumaric acid, tartaric acid, 4-methylphthalic acid, or citric acid is preferable, and malonic acid, malic acid, tartaric acid, glutaric acid, or citric acid is more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammonium chloride).

The water-soluble cationic polymer can refer to the descriptions in known documents such as JP2011-042150A (particularly, paragraph 0156) and JP2007-98610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-7 and CATIOMASTER PD-30 (both manufactured by Yokkaichi Chemical Co., Ltd.) and UNISENCE FPA100L (manufactured by Senka Corporation).

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the treatment liquid.

—Water—

It is preferable that the treatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less and more preferably 80% by mass or less with respect to the total amount of the pretreatment liquid.

—Resin Particles—

The treatment liquid may contain resin particles. In a case where the treatment liquid contains resin particles, an image with excellent adhesiveness can be obtained.

The glass transition temperature (Tg) of the resin particles contained in the pretreatment liquid is preferably in a range of 30° C. to 120° C., more preferably in a range of 30° C. to 80° C., still more preferably in a range of 40° C. to 60° C., and even still more preferably in a range of 45 to 60° C.

The method of measuring the glass transition temperature of the resin particles is as described above.

Examples of the resin in the resin particles include a polyurethane resin, a polyamide resin, a polyurea resin, a polycarbonate resin, a polyolefin resin, a polystyrene resin, a polyester resin, and an acrylic resin. Among these, the resin particles contain preferably a polyester resin or an acrylic resin and more preferably a polyester resin.

Further, acrylic resin particles, polyester resin particles, a mixture of acrylic resin particles and polyester resin particles, or composite particles containing an acrylic resin and a polyester resin are preferable as the resin particles.

The resin in the resin particles has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the specific resin.

From the viewpoint that the particles containing the specific resin are preferably used as water-dispersible resin particles described below, it is preferable that the resin in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, and an amount of the ionic group set such that the particles containing the specific resin are water-dispersible resin particles can be preferably used. For example, the amount thereof is preferably in a range of 0.001 mol to 1.0 mol and more preferably in a range of 0.01 mol to 0.5 mol, per 100 g of the resin contained in the particles containing the specific resin.

The weight-average molecular weight (Mw) of the resin in the resin particles is preferably in a range of 1000 to 300000, more preferably in a range of 2000 to 200000, and still more preferably in a range of 5000 to 100000.

It is preferable that the resin particles are water-dispersible resin particles.

In the present disclosure, the water dispersibility indicates a property in which precipitation is not confirmed after a substance is stirred in water at 20° C. and the solution is allowed to stand at 20° C. for 60 minutes.

The volume average particle diameter of the resin particles is preferably in a range of 1 nm to 300 nm, more preferably in a range of 3 nm to 200 nm, and still more preferably in a range of 5 nm to 150 nm.

Further, as the resin particles, the same resin particles as those in the ink described above may be used.

In a case of preparing the pretreatment liquid, a commercially available product of an aqueous dispersion liquid of resin particles may be used.

Examples of the commercially available product of an aqueous dispersion liquid of resin particles include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

The content of resin particles is not particularly limited.

The content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

—Water-Soluble Solvent—

It is preferable that the treatment liquid contains at least one kind of water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (such as ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (such as diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (such as diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-42150A.

Among these, from the viewpoint of suppressing transfer of components, polyhydric alcohol or polyhydric alcohol ether is preferable, and alkanediol, polyalkylene glycol, or polyalkylene glycol ether is more preferable.

—Surfactant—

The treatment liquid may contain at least one kind of surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

For example, in a case where the treatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the treatment liquid.

—Other Components—

The treatment liquid may contain other components in addition to the above-described components as necessary.

Examples of other components that may be contained in the treatment liquid include known additives such as a solid wetting agent, colloidal silica, an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(Physical Properties of Treatment Liquid)

From the viewpoint of the aggregation rate of the ink, the pH of the treatment liquid at 25° C. is preferably in a range of 0.1 to 3.5.

In a case where the pH of the treatment liquid is 0.1 or greater, the roughness of the impermeable base material is further reduced and the adhesiveness of the image area is further improved.

In a case where the pH of the treatment liquid is 3.5 or less, the aggregation rate is further improved, coalescence of dots (ink dots) caused by the ink on the surface of the impermeable base material is further suppressed, and the roughness of the image is further reduced.

The pH of the treatment liquid at 25° C. is more preferably in a range of 0.2 to 2.0. The conditions for measuring the pH of the treatment liquid at 25° C. are the same as the conditions for measuring the pH of the ink at 25° C. described above.

In the case where the treatment liquid contains an aggregating agent, from the viewpoint of the aggregation rate of the ink, the viscosity of the treatment liquid is preferably in a range of 0.5 mPa·s to 10 mPa·s and more preferably in a range of 1 mPa·s to 5 mPa·s. The conditions for measuring the viscosity of the treatment liquid here are the same as the conditions for measuring the viscosity of the ink described above.

The surface tension of the treatment liquid at 25° C. is preferably 60 mN/m or less, more preferably in a range of 20 mN/m to 50 mN/m, and still more preferably in a range of 30 mN/m to 45 mN/m. The conditions for measuring the surface tension of the treatment liquid here are the same as the conditions for measuring the surface tension of the ink described above.

[Method of Producing Laminate]

As described above, according to the ink and the image recording method of the present disclosure, an image having excellent lamination strength between the base material for lamination and the image can be recorded.

Therefore, the ink of the present disclosure and the image recording method of the present disclosure are suitably used for producing a laminate comprising an image recorded material that comprises an impermeable base material and an image disposed on the impermeable base material; and a base material for lamination which is laminated on a side where the image of the image recorded material is disposed.

Hereinafter, the method of producing the laminate will be described.

The method of producing the laminate of the present disclosure includes a step of obtaining an image recorded material which comprises the impermeable base material and the image disposed on the impermeable base material using the image recording method described above; and a step of laminating a base material for lamination on the image recorded material on a side where the image has been disposed to obtain a laminate.

According to the method of producing the laminate of the present disclosure, a laminate having excellent lamination strength between the image in the image recorded material and the base material for lamination can be produced.

The step of obtaining an image recorded material can refer to the image recording method of the present disclosure described above.

The step of obtaining a laminate is a step of laminating the base material for lamination on a side of the image recorded material where the image has been disposed to obtain a laminate.

As the base material for lamination, a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The shape of the resin base material is not particularly limited, but it is preferable that the resin base material is in the form of a sheet.

The thickness of the resin base material is preferably in a range of 10 μm to 200 μm and more preferably in a range of 10 μm to 100 μm.

In the present step, the base material for lamination may be laminated directly on a side of the image recorded material where the image has been disposed or through another layer (for example, an adhesive layer).

The base material for lamination in a case of being directly laminated on a side of the image recorded material where the image has been disposed can be laminated according to a known method such as thermocompression bonding or thermal fusion welding.

Further, the base material for lamination in a case of being laminated through an adhesive layer on a side of the image recorded material where the image has been recorded can be laminated according to, for example, a method of coating the side of the image recorded material where the image has been recorded with an adhesive, placing the base material for lamination, and bonding the image recorded material to the base material for lamination.

Further, the base material for lamination in the case of being laminated through an adhesive layer on a side of the image recorded material where the image has been recorded can be laminated according to an extrusion lamination method (that is, sandwich lamination) or the like.

It is preferable that the adhesive layer in the mode of laminating the base material through the adhesive layer on a side of the image recorded material where the image has been recorded contains an isocyanate compound.

In a case where the adhesive layer contains an isocyanate compound, since the adhesiveness between the adhesive layer and the ink-derived layer of the image is further improved, the lamination strength can be further improved.

EXAMPLES

Hereinafter, examples of the present disclosure will be described below, but the present disclosure is not limited to the following examples.

Hereinafter, "%" and "part" respectively indicate "% by mass" and "part by mass" unless otherwise specified.

As "water", ion exchange water was used.

The unit of the SP value is $MPa^{1/2}$.

Example 1

<Preparation of Aqueous Dispersion of Crosslinked Resin-Coated Cyan Pigment 1>

An aqueous dispersion of a crosslinked resin-coated cyan pigment 1 was prepared in the following manner.

(Synthesis of Resin 1 (Water-Soluble Resin Dispersant Containing Carboxy Group))

A resin 1 was synthesized as a water-soluble resin dispersant containing a carboxy group in the following manner.

A monomer feed composition was prepared by mixing methacrylic acid (200 parts), benzyl methacrylate (800 parts), and isopropanol (375 parts). Further, an initiator feed composition was prepared by mixing 2,2-azobis(2-methylbutyronitrile) (22.05 parts) and isopropanol (187.5 parts).

Next, isopropanol (187.5 parts) was heated to 80° C. in a nitrogen atmosphere, and a mixture of the monomer feed composition and the initiator feed composition was added dropwise thereto for 2 hours. After completion of the dropwise addition, the obtained solution was further maintained at 80° C. for 4 hours and then cooled to 25° C.

After the cooling of the solution, the solvent was removed under reduced pressure, thereby obtaining the resin 1 (a water-soluble resin dispersant containing a carboxy group) having a weight-average molecular weight of 30000 and an acid value of 130 mgKOH/g.

(Preparation of Aqueous Dispersion of Crosslinked Resin-Coated Cyan Pigment 1)

0.8 equivalents of the amount of methacrylic acid in the resin 1 (150 parts) obtained in the above-described manner was neutralized using a potassium hydroxide aqueous solution, and water was further added to thereto such that the concentration of the resin 1 after the neutralization was adjusted to 25% by mass, thereby obtaining an aqueous solution of the resin 1 after the neutralization.

The aqueous solution (124 parts) of the resin 1 after the neutralization, Pigment Blue 15: 3 (cyan pigment) (48 parts), water (75 parts), and dipropylene glycol (30 parts) were mixed and dispersed with a beads mill (bead diameter of 0.1 mmφ, zirconia beads), thereby obtaining an uncrosslinked dispersion of a resin-coated cyan pigment having a cyan pigment concentration of 15% by mass.

Denacol EX-321 (manufactured by Nagase ChemteX Corporation, crosslinking agent) (1.8 parts) and a boric acid aqueous solution (boric acid concentration: 4% by mass) (14.3 parts) were added to the uncrosslinked dispersion (136 parts), and the mixture was allowed to react at 50° C. for 6 and a half hours and then cooled to 25° C., thereby obtaining a crosslinked dispersion. Next, water was added to the obtained crosslinked dispersion, and ultrafiltration was performed using a stirring type ultra holder (manufactured by ADVANTEC) and an ultrafiltration filter (manufactured by ADVANTEC, molecular weight cutoff of 50000, Q0500076E ultrafilter). The resultant was purified such that the concentration of dipropylene glycol in the crosslinked dispersion reached 0.1% by mass or less and concentrated until the pigment concentration reached 15% by mass, thereby obtaining an aqueous dispersion (cyan pigment concentration of 15% by mass) of the crosslinked resin-coated cyan pigment 1.

The crosslinked resin-coated cyan pigment 1 is a crosslinked resin-coated pigment in which at least a part of the cyan pigment is coated with the resin 1 crosslinked by a crosslinking agent.

The acid value of the crosslinked resin (that is, the acid value of the resin 1 after being crosslinked) in the crosslinked resin-coated cyan pigment 1 was 60 mgKOH/g (see Table 1).

<Preparation of Aqueous Dispersion Liquid of Acryl 1 (Resin Particles)>

As described below, an aqueous dispersion liquid of resin particles in which the acryl 1 as resin particles was dispersed in water was prepared.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of water was added dropwise to the liquid which had been heated to 70° C., at a speed of 10 mL/min, to carry out aqueous dispersion (dispersion step).

Thereafter, the isopropanol, the methyl ethyl ketone, and the water in a total amount of 287.0 g were distilled off by maintaining the temperature of the liquid in the reaction container at 70° C. for 1.5 hours under reduced pressure (solvent removal step). 0.278 g (440 mass ppm as benzisothiazolin-3-one as the solid content of the polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid of the acryl 1 (non-volatile content concentration of 23.2% by mass) as resin particles formed of a copolymer of methyl methacrylate, isobornyl methacrylate, methacrylic acid, and sodium methacrylate at a mass ratio of 70/20/5/5. The volume average particle diameter of the acryl 1 was 5.0 nm, and the weight-average molecular weight (Mw) of the acryl 1 was 60000.

<Preparation of Ink>

An ink having the following composition was prepared using the aqueous dispersion of the crosslinked resin-coated cyan pigment 1, the aqueous dispersion liquid of the acryl 1, propylene glycol, propylene glycol monomethyl ether, OLEFIN E1010 (surfactant, manufactured by Nissin Chemical Co., Ltd.), and water.

—Ink Composition—

Crosslinked resin-coated cyan pigment 1 . . . 4.0% by mass

Propylene glycol (PG) (solvent A, manufactured by Fujifilm Wako Pure Chemical Corporation) . . . 20% by mass Propylene glycol monomethyl ether (PGmME) (solvent B, manufactured by Fujifilm Wako Pure Chemical Corporation) . . . 6% by mass Solid content of acryl 1 (resin particles) in aqueous dispersion liquid (acryl 1) . . . 6% by mass OLFINE E1010 (manufactured by Nissin Chemical Co., Ltd., surfactant) . . . 1% by mass Water . . . remaining amount set such that total amount of composition was 100% by mass <Image Recording>

Image recording was performed in the following manner using the ink described above and a biaxially oriented polypropylene (OPP) film (thickness of 40 μm, surface treatment: corona discharge treatment, manufactured by Futamura Chemical Co., Ltd.) as an impermeable base material.

(1) Recording Method

A solid image was recorded by applying the ink onto the surface of the impermeable base material, on which a corona discharge treatment had been performed, in the form of a solid image using an ink jet recording device equipped with a transport system for transporting a base material and an ink jet head and drying the applied ink at 80° C. for 30 seconds. The ink was dried by placing the impermeable base material, to which the ink had been applied, on a hot plate.

(2) Recording Conditions

Ink jet head: 1200 dpi (dot per inch)/20 inch-width piezo full line head

Ink jet amount: 4.0 pL

Driving frequency: 30 kHz (transportation speed of base material: 635 mm/sec)

<Evaluation>

The following evaluations were performed on the inks or images.

The results are listed in Table 1.

(Drying Properties of Image)

The above-described OPP film was superimposed and adhered onto the solid image 5 minutes after the recording of the solid image in the image recording (that is, drying of the image at 80° C. for 30 seconds), and the OPP film was peeled off. The state of transfer of the cyan solid image to the OPP film was visually observed, and the drying properties of the cyan solid image were evaluated based on the following evaluation standards.

In the evaluation standards, the rank of the most excellent drying properties of the cyan solid image is "5".

—Evaluation Standards for Drying Properties of Image—

5: Transfer of the cyan solid image was not found at all.

4: Transfer of the cyan solid image was found in less than 5% of the entire cyan solid image.

3: Transfer of the cyan solid image was found in 5% or greater and less than 10% of the entire cyan solid image.

2: Transfer of the cyan solid image was found in 10% or greater and less than 15% of the entire cyan solid image.

1: Transfer of the cyan solid image was found in 15% or greater of the entire cyan solid image.

(Jettability of Ink)

Cyan solid images were continuously recorded on 40 sheets of recording paper under the same conditions for the image recording using A2 size recording paper (ink jet photographic paper, KASSAI, manufactured by Fujifilm Corporation). Hereinafter, the recording paper on which the cyan solid image is formed will be referred to as a "sample for evaluating jettability".

Forty sheets of samples for evaluating jettability were visually observed, and the number of sheets of samples for evaluating jettability in which nozzle slip-out (that is, image defects caused by nozzle jetting failure) was confirmed was investigated. Based on the result thereof, the jettability of the ink was evaluated based on the following evaluation standards.

In the following evaluation standards, the rank of the most excellent jettability of the ink is "5".

—Evaluation Standards for Jettability of Ink—

5: The number of sheets of samples in which nozzle slip-out was confirmed was 0 or 1.

4: The number of sheets of samples in which nozzle slip-out was confirmed was 2 or 3.

3: The number of sheets of samples in which nozzle slip-out was confirmed was 4 or 5.

2: The number of sheets of samples in which nozzle slip-out was confirmed was 6 or 1: The number of sheets of samples in which nozzle slip-out was confirmed was 8 or greater.

(Re-Jettability of Ink after Jetting Pause)

The jetting of the ink was paused for 24 hours after the completion of image recording (jetting of the ink) in the evaluation of the jettability.

After the pause for 24 hours, the jetting of the ink was started again, the same evaluation as the evaluation of the jettability of the ink was performed, and the re-jettability of the ink after jetting pause was evaluated based on the same evaluation standards as the evaluation standards for the evaluation of the jettability of the ink.

In the following evaluation standards, the rank of the most excellent re-jettability of the ink is "5".

(Lamination Strength)

An image recorded material in which a solid image had been recorded on an impermeable base material (OPP film) was obtained according to the image recording described above.

A region having a length of 500 mm and a width of 500 mm (hereinafter, also referred to as a lamination strength evaluation region) in which the solid image was provided on the entire surface was cut out from the image recorded material and used as a lamination strength evaluation sample.

The solid image in the lamination strength evaluation sample was coated with an adhesive for dry lamination (main agent TM-320 (isocyanate compound)/curing agent CAT-13B (alcohol compound), manufactured by Toyo Morton, Ltd.) using a bar coater, and a cast polypropylene (CPP) film (trade name: PYLEN P1128, manufactured by Toyobo Co., Ltd., thickness of 25 μm) was superimposed thereon as the base material for lamination. In this state, the base material for lamination and the sample for evaluating the lamination strength were attached to each other, thereby obtaining a laminate.

The obtained laminate was aged at 40° C. for 48 hours.

A sample piece having a length of 100 mm and a width of 15 mm was cut out from the aged laminate.

Next, the base material for lamination and the sample for evaluating the lamination strength in a region from the one end in the longitudinal direction to a length of 30 mm in the sample piece were peeled by hand. The remaining region with a length of 70 mm was allowed to remain in a state where the base material for lamination and the sample for evaluating the lamination strength were attached to each other.

Next, a tensile test of stretching the peeled portion of the base material for lamination and the peeled portion of the sample for evaluating the lamination strength in opposite directions in the sample piece was performed. The stretching direction was a direction perpendicular to the above-described remaining region with a length of 70 mm (the remaining region in a state where the base material for lamination and the sample for evaluating the lamination strength were attached to each other).

The peel strength for peeling the base material for lamination and the sample for evaluating the lamination strength in the remaining region with a length of 70 mm was acquired by performing the tensile test, and the obtained peel strength was set as the lamination strength.

Based on the obtained lamination strength, the lamination strength between the sample for evaluating the lamination strength (that is, the image recorded material) and the base material for lamination was evaluated based on the following evaluation standards. In this manner, the lamination strength between the image and the base material for lamination in the image recorded material was evaluated.

The results are listed in Table 1.

Further, the tensile test was performed using a tensile tester (TENSILON RTM-25, manufactured by Orientec Co., Ltd.).

—Evaluation Standards for Lamination Strength—

5: The lamination strength between the image recorded material and the base material for lamination was 2 N/15 mm or greater.

4: The lamination strength between the image recorded material and the base material for lamination was 1.5 N/15 mm or greater and less than 2 N/15 mm.

3: The lamination strength between the image recorded material and the base material for lamination was 1 N/15 mm or greater and less than 1.5 N/15 mm.

2: The lamination strength between the image recorded material and the base material for lamination was 0.5 N/15 mm or greater and less than 1 N/15 mm.

1: The lamination strength between the image recorded material and the base material for lamination was less than 0.5 N/15 mm.

(Preservation Stability of Ink)

The preservation stability of the ink was evaluated in the following manner.

The viscosity of the ink that was allowed to stand at 25° C. for 1 hour after the preparation of the ink (hereinafter, referred to as the "viscosity before storage") and the viscosity of the ink that was stored in a sealed state at 50° C. for 14 days after the preparation of the ink (hereinafter, referred to as the "viscosity after storage") were respectively measured. Both the viscosity before storage and the viscosity after storage were measured under conditions of 30° C. at 100 rpm (revolutions per minute) using VISCOMETER TV-22 (manufactured by Toki Sangyo Co., Ltd.). Here, the sealed state indicates a state in which the contents are sealed in a container and the amount of decrease in the mass of the contents is less than 1% by mass in a case where the contents are stored under the conditions of 50° C. for 14 days.

The value obtained by subtracting the viscosity before storage from the viscosity after storage was acquired, and the preservation stability of the ink was evaluated based on the following evaluation standards.

In the following evaluation standards, the rank of the most excellent preservation stability of the ink is "5".

—Evaluation Standards for Preservation Stability of Ink

5: The value obtained by subtracting the viscosity before storage from the viscosity after storage was less than 0.3 mPa·s.

4: The value obtained by subtracting the viscosity before storage from the viscosity after storage was 0.3 mPa·s or greater and less than 0.5 mPa·s.

3: The value obtained by subtracting the viscosity before storage from the viscosity after storage was 0.5 mPa·s or greater and less than 1.0 mPa·s.

2: The value obtained by subtracting the viscosity before storage from the viscosity after storage was 1.0 mPa·s or greater and less than 2.0 mPa·s.

1: The value obtained by subtracting the viscosity before storage from the viscosity after storage was 2.0 mPa·s or greater.

Examples 2 to 11

The same operation as in Example 1 was performed except that the combination of the kind of the resin before being crosslinked in the crosslinked resin-coated pigment, the acid value of the resin after being crosslinked in the crosslinked resin-coated pigment, and the content of the solvent B in the ink was changed as listed in Table 1.

The results are listed in Table 1.

The acid value of the resin after being crosslinked was changed by changing the amount of the potassium hydroxide aqueous solution and the amount of Denacol EX-321 (crosslinking agent) in the preparation of the aqueous dispersion of the crosslinked resin-coated cyan pigment 1.

In the example in which the kind of the resin before being crosslinked in the crosslinked resin-coated pigment was changed, a resin 2 (a resin dispersant containing a carboxy group) synthesized in the following manner was used in place of the resin 1 (the resin dispersant containing a carboxy group), and the amount of the potassium hydroxide aqueous solution and the amount of Denacol EX-321 (crosslinking agent) in the preparation of the aqueous dispersion of the crosslinked resin-coated cyan pigment were adjusted such that the acid value of the resin after being crosslinked was set to the value listed in Table 1.

<Synthesis of Resin 2 (Resin Dispersant Containing Carboxy Group)>

The resin 2 (the acid value before being crosslinked: 163 mgKOH/g) was obtained in the same manner as in the synthesis of the resin 1 except that methacrylic acid (200 parts) and benzyl methacrylate (800 parts) in the monomer feed composition were respectively changed to methacrylic acid (250 parts) and benzyl methacrylate (750 parts).

Examples 12 to 23

The same operation as in Example 1 was performed except that the combination of the kind of the solvent A and the kind of the solvent B was changed as listed in Table 1.

The results are listed in Table 1 or Table 2.

Example 24

The same operation as in Example 1 was performed except that the resin particles (acryl 1) were changed to the acryl 2 which was a water-soluble acrylic resin (that is, a non-particle-like acrylic resin).

The results are listed in Table 2.

The ink of Example 24 was prepared using an aqueous solution of the acryl 2 ("ARON A-20L", manufactured by Toagosei Co., Ltd. (Mw of acrylic resin=500000)).

Examples 25 and 26

The same operation as in Example 1 was performed except that the kind of the resin particles (acryl 1) was changed to urethane 1 which is a urethane resin and polyester 1 which is a polyester resin.

The results are listed in Table 2.

The preparation in these examples was carried out using a urethane emulsion "WBR-2101" (concentration of nonvolatile content: 27% by mass, manufactured by Taisei Fine Chemical Co., Ltd.) which is an aqueous dispersion liquid of the urethane 1, and a polyester emulsion "WR-961" (concentration of nonvolatile content: 30% by mass, manufactured by Nippon Synthetic Chemical Industry Co., Ltd.) which is an aqueous dispersion liquid of the polyester 1.

Comparative Examples 1 to 7

The same operation as in Example 1 was performed except that the combination of the presence or absence of crosslinking (that is, crosslinking or uncrosslinking) of the resin in the resin-coated pigment, the presence or absence of the solvent A, the kind of the solvent A, the presence or absence of the solvent B, and the kind of the solvent B was changed as listed in Table 2.

The results are listed in Table 2.

In the comparative example in which the resin in the resin-coated pigment was uncrosslinked, the "uncrosslinked dispersion of the resin-coated cyan pigment" which was a dispersion before being crosslinked was used in place of the aqueous dispersion of the crosslinked resin-coated cyan pigment 1 in the preparation of the ink.

TABLE 1

| | Resin in resin-coated pigment | | | Solvent A | | | | Solvent B | | | |
|---|---|---|---|---|---|---|---|---|---|---|---|
| | Type of resin before being crosslinked | Crosslinked or uncrosslinked | Acid value of resin after being crosslinked (*1) | Type | Boiling point (° C.) | SP value | Amount (%) | Type | Boiling point (° C.) | SP value | Amount (%) (*2) |
| Example 1 | Resin 1 | Crosslinked | 60 | PG | 188 | 35.1 | 20 | PGmME | 120 | 23.6 | 6 |
| Example 2 | Resin 1 | Crosslinked | 48 | PG | 188 | 35.1 | 20 | PGmME | 120 | 23.6 | 6 |
| Example 3 | Resin 1 | Crosslinked | 36 | PG | 188 | 35.1 | 20 | PGmME | 120 | 23.6 | 6 |
| Example 4 | Resin 1 | Crosslinked | 84 | PG | 188 | 35.1 | 20 | PGmME | 120 | 23.6 | 6 |
| Example 5 | Resin 1 | Crosslinked | 84 | PG | 188 | 35.1 | 20 | PGmME | 120 | 23.6 | 10 |
| Example 6 | Resin 2 | Crosslinked | 100 | PG | 188 | 35.1 | 20 | PGmME | 120 | 23.6 | 6 |
| Example 7 | Resin 2 | Crosslinked | 100 | PG | 188 | 35.1 | 20 | PGmME | 120 | 23.6 | 10 |
| Example 8 | Resin 2 | Crosslinked | 80 | PG | 188 | 35.1 | 20 | PGmME | 120 | 23.6 | 10 |
| Example 9 | Resin 2 | Crosslinked | 100 | PG | 188 | 35.1 | 20 | PGmME | 120 | 23.6 | 12 |
| Example 10 | Resin 1 | Crosslinked | 60 | PG | 188 | 35.1 | 20 | PGmME | 120 | 23.6 | 3 |
| Example 11 | Resin 1 | Crosslinked | 60 | PG | 188 | 35.1 | 20 | PGmME | 120 | 23.6 | 12 |
| Example 12 | Resin 1 | Crosslinked | 60 | PG | 188 | 35.1 | 20 | PGmEE | 132 | 22.5 | 6 |
| Example 13 | Resin 1 | Crosslinked | 60 | PG | 188 | 35.1 | 20 | PGmPE | 149 | 21.7 | 6 |
| Example 14 | Resin 1 | Crosslinked | 60 | PG | 188 | 35.1 | 20 | EGmME | 124 | 25.2 | 6 |
| Example 15 | Resin 1 | Crosslinked | 60 | PG | 188 | 35.1 | 20 | EGmEE | 135 | 23.7 | 6 |
| Example 16 | Resin 1 | Crosslinked | 60 | PG | 188 | 35.1 | 20 | EtOH | 78 | 25.7 | 6 |
| Example 17 | Resin 1 | Crosslinked | 60 | PG | 188 | 35.1 | 20 | 2-PrOH | 82 | 23.6 | 6 |
| Example 18 | Resin 1 | Crosslinked | 60 | PG | 188 | 35.1 | 20 | 1-BuOH | 117 | 22.3 | 6 |
| Example 19 | Resin 1 | Crosslinked | 60 | PG | 188 | 35.1 | 20 | 3-MeO-1-BuOH | 158 | 22.5 | 6 |

TABLE 1-continued

| | Ink | | | | | | | | |
|---|---|---|---|---|---|---|---|---|---|
| | Resin component | | | Difference in SP value [Average SP value of solvent A and solvent B-SP value of resin component] | (*1)/(*2) | Evaluation result | | | |
| | Resin particles | Water-soluble resin | SP value | | | Drying properties | Lamination strength | Jettability | Re-jettability | Preservation stability |
| Example 1 | Acryl 1 | — | 19.7 | 9.6 | 10.0 | 5 | 5 | 5 | 5 | 5 |
| Example 2 | Acryl 1 | — | 19.7 | 9.6 | 8.0 | 5 | 5 | 5 | 5 | 5 |
| Example 3 | Acryl 1 | — | 19.7 | 9.6 | 6.0 | 5 | 5 | 4 | 4 | 5 |
| Example 4 | Acryl 1 | — | 19.7 | 9.6 | 14.0 | 5 | 5 | 5 | 5 | 5 |
| Example 5 | Acryl 1 | — | 19.7 | 9.6 | 8.4 | 5 | 5 | 5 | 5 | 5 |
| Example 6 | Acryl 1 | — | 19.7 | 9.6 | 16.7 | 5 | 5 | 5 | 5 | 4 |
| Example 7 | Acryl 1 | — | 19.7 | 9.6 | 10.0 | 5 | 5 | 5 | 5 | 5 |
| Example 8 | Acryl 1 | — | 19.7 | 9.6 | 8.0 | 5 | 5 | 5 | 5 | 5 |
| Example 9 | Acryl 1 | — | 19.7 | 9.6 | 8.3 | 5 | 5 | 4 | 4 | 5 |
| Example 10 | Acryl 1 | — | 19.7 | 9.6 | 20.0 | 4 | 3 | 5 | 5 | 5 |
| Example 11 | Acryl 1 | — | 19.7 | 9.6 | 5.0 | 5 | 5 | 3 | 3 | 5 |
| Example 12 | Acryl 1 | — | 19.7 | 9.1 | 10.0 | 5 | 5 | 5 | 5 | 5 |
| Example 13 | Acryl 1 | — | 19.7 | 8.7 | 10.0 | 4 | 4 | 5 | 5 | 5 |
| Example 14 | Acryl 1 | — | 19.7 | 10.5 | 10.0 | 5 | 5 | 5 | 5 | 5 |
| Example 15 | Acryl 1 | — | 19.7 | 9.7 | 10.0 | 5 | 5 | 5 | 5 | 5 |
| Example 16 | Acryl 1 | — | 19.7 | 10.7 | 10.0 | 5 | 5 | 5 | 5 | 5 |
| Example 17 | Acryl 1 | — | 19.7 | 9.7 | 10.0 | 5 | 5 | 5 | 5 | 5 |
| Example 18 | Acryl 1 | — | 19.7 | 9.0 | 10.0 | 5 | 5 | 5 | 5 | 5 |
| Example 19 | Acryl 1 | — | 19.7 | 9.1 | 10.0 | 4 | 4 | 5 | 5 | 5 |

TABLE 2

| | Ink | | | | | | | | | |
|---|---|---|---|---|---|---|---|---|---|---|
| | Resin in resin-coated pigment | | | Solvent A comparative solvent | | | | Solvent B or comparative solvent | | |
| | Type of resin before being cross-linked | Crosslinked or uncrosslinked | Acid value of resin after being cross-linked (*1) | Type | Boiling point (° C.) | SP value | Amount (%) | Type | Boiling point (° C.) | SP value | Amount (%) (*2) |
| Example 20 | Resin 1 | Crosslinked | 60 | EG | 197 | 40.7 | 20 | PGmME | 120 | 23.6 | 6 |
| Example 21 | Resin 1 | Crosslinked | 60 | EG | 197 | 40.7 | 20 | EtOH | 78 | 25.7 | 6 |
| Example 22 | Resin 1 | Crosslinked | 60 | 1,2-BDO | 194 | 31.4 | 20 | PGmME | 120 | 23.6 | 6 |
| Example 23 | Resin 1 | Crosslinked | 60 | 1,2-BDO | 194 | 31.4 | 20 | EtOH | 78 | 25.7 | 6 |
| Example 24 | Resin 1 | Crosslinked | 60 | PG | 188 | 35.1 | 20 | PGmME | 120 | 23.6 | 6 |
| Example 25 | Resin 1 | Crosslinked | 60 | PG | 188 | 35.1 | 20 | PGmME | 120 | 23.6 | 6 |
| Example 26 | Resin 1 | Crosslinked | 60 | PG | 188 | 35.1 | 20 | PGmME | 120 | 23.6 | 6 |
| Comparative Example 1 | Resin 1 | Crosslinked | 60 | PG | 188 | 35.1 | 20 | None | — | — | — |
| Comparative Example 2 | Resin 1 | Crosslinked | 60 | None | — | — | — | PGmME | 120 | 23.6 | 6 |
| Comparative Example 3 | Resin 1 | Uncrosslinked | — | PG | 188 | 35.1 | 15 | PGmME | 120 | 23.6 | 10 |
| Comparative Example 4 | Resin 1 | Uncrosslinked | — | PG | 188 | 35.1 | 20 | PGmME | 120 | 23.6 | 6 |
| Comparative Example 5 | Resin 1 | Uncrosslinked | — | PG | 188 | 35.1 | 20 | EtOH | 78 | 25.7 | 6 |
| Comparative Example 6 | Resin 1 | Crosslinked | 60 | 1,3-PDO (Comparative solvent) | 214 | 35.1 | 20 | PGmPE | 120 | 23.6 | 6 |
| Comparative Example 7 | Resin 1 | Crosslinked | 60 | PG | 188 | 35.1 | 20 | DEGmME (Comparative solvent) | 193 | 23.7 | 6 |

TABLE 2-continued

| | | | | | | | | | | | |
|---|---|---|---|---|---|---|---|---|---|---|---|
| Comparative Example 8 | Resin 1 | Crosslinked | 60 | PG | 188 | 35.1 | 30 | DEGmME (Comparative solvent) | 230 | 21.5 | 5 |
| Comparative Example 9 | Resin 1 | Crosslinked | 60 | DEGmME (Comparative solvent) | 193 | 23.7 | 20 | PGmPE | 120 | 23.6 | 6 |

| | Resin component | | Ink SP value | Difference in SP value [Average SP value of solvent A and solvent B-SP value of resin component] | (*1)/(*2) | Evaluation result | | | | |
|---|---|---|---|---|---|---|---|---|---|---|
| | Resin particles | Water-soluble resin | | | | Drying properties | Lamination strength | Jettability | Re-jettability | Preservation stability |
| Example 20 | Acryl 1 | — | 19.7 | 12.4 | 10.0 | 5 | 5 | 5 | 5 | 5 |
| Example 21 | Acryl 1 | — | 19.7 | 13.5 | 10.0 | 5 | 5 | 5 | 5 | 5 |
| Example 22 | Acryl 1 | — | 19.7 | 7.8 | 10.0 | 5 | 5 | 4 | 4 | 5 |
| Example 23 | Acryl 1 | — | 19.7 | 8.9 | 10.0 | 5 | 5 | 5 | 5 | 5 |
| Example 24 | — | Acryl 2 | 21.9 | 7.4 | 10.0 | 5 | 5 | 4 | 4 | 5 |
| Example 25 | Urethane 1 | — | 19.1 | 10.2 | 10.0 | 5 | 5 | 5 | 5 | 5 |
| Example 26 | Polyester 1 | — | 18.3 | 11.0 | 10.0 | 5 | 5 | 5 | 5 | 5 |
| Comparative Example 1 | Acryl 1 | — | 19.7 | 15.4 | — | 2 | 1 | 5 | 5 | 5 |
| Comparative Example 2 | Acryl 1 | — | 19.7 | 3.9 | 10.0 | 5 | 5 | 1 | 1 | 5 |
| Comparative Example 3 | Acryl 1 | — | 19.7 | 9.6 | — | 5 | 2 | 5 | 1 | 5 |
| Comparative Example 4 | Acryl 1 | — | 19.7 | 9.6 | — | 5 | 2 | 5 | 1 | 5 |
| Comparative Example 5 | Acryl 1 | — | 19.7 | 10.7 | — | 5 | 2 | 5 | 1 | 5 |
| Comparative Example 6 | Acryl 1 | — | 19.7 | 9.6 | 10.0 | 2 | 5 | 5 | 5 | 5 |
| Comparative Example 7 | Acryl 1 | — | 19.7 | 9.7 | 10.0 | 1 | 1 | 5 | 5 | 5 |
| Comparative Example 8 | Acryl 1 | — | 19.7 | 8.6 | 12.0 | 1 | 1 | 5 | 5 | 5 |
| Comparative Example 9 | Acryl 1 | — | 19.7 | 3.9 | 10.0 | 4 | 1 | 1 | 1 | 5 |

—Explanation of Table 1 and Table 2—

The "amount" in each solvent indicates the content (% by mass) with respect to the total amount of the ink.

(*1)/(*2) is a value obtained by dividing the acid value of the crosslinked resin in the unit of mgKOH/g (that is, the acid value after the crosslinking) by the content (% by mass) of the solvent B with respect to the total amount of the ink.

—Solvent in Columns of "Solvent a or Comparative Solvent"—

PG: propylene glycol
EG: ethylene glycol
1,2-BDO: 1,2-butanediol
1,3-PDO: 1,2-propanediol (comparative solvent; boiling point of higher than 200° C.)
DEGmME: diethylene glycol monomethyl ether (comparative solvent; non-alkanediol compound)

—Solvent in Columns of "Solvent B or Comparative Solvent"—

PGmME: propylene glycol monomethyl ether
PGmEE: propylene glycol monoethyl ether
PGmPE: propylene glycol monopropyl ether
EGmME: ethylene glycol monomethyl ether
EGmEE: ethylene glycol monoethyl ether
EtOH: ethanol
2-PrOH: 2-propanol
1-BuOH: 1-butanol
3-MeO-1-BuOH: 3-methoxy-1-butanol
DEGmME: diethylene glycol monomethyl ether (comparative solvent; boiling point of higher than 160° C.)
DEGmBE: diethylene glycol monobutyl ether (comparative solvent: boiling point of higher than 160° C.)

As listed in Tables 1 and 2, in each example in which the ink containing water, a resin-coated pigment in which at least a part of the pigment was coated with a crosslinked resin, a solvent A which was an alkanediol compound having a boiling point of 180° C. to 200° C., and a solvent B which was at least one of a monoalcohol compound having a boiling point of 70° C. to 160° C. or a glycol monoether compound having a boiling point of 70° C. to 160° C. was used, the drying properties of the image, the lamination strength of the image, and the re jettability of the ink after jetting pause were excellent.

The results of each comparative example as compared to each example were as follows.

In Comparative Example 1 in which an ink that did not contain the solvent B was used, the drying properties and the lamination strength of the image were degraded.

In Comparative Example 2 in which an ink that did not contain the solvent A was used, the re-jettability of the ink was degraded.

In Comparative Examples 3 to 5 in which an ink with a resin that was not crosslinked in the resin-coated pigment was used, the lamination strength of the image and the re-jettability of the ink were degraded.

In Comparative Example 6 in which an ink containing a comparative solvent having a boiling point of higher than 200° C. was used in place of the solvent A was used, the drying properties of the ink were degraded.

In Comparative Examples 7 and 8 in which an ink containing a comparative solvent having a boiling point of higher than 160° C. was used in place of the solvent B, the drying properties and the lamination strength of the image were degraded.

In Comparative Example 9 in which a comparative solvent which was a solvent other than the alkanediol compound was used in place of the solvent A, the lamination strength of the image was degraded.

As shown in the results of Examples 1 and 24, it was found that in a case where the ink further contains resin particles (Example 1), the jettability and the re jettability of the ink are further improved.

As shown in the results of Examples 22 and 23, it was found that in a case where the value obtained by subtracting the SP value of the resin particles from the average SP value of the solvent A and the solvent B ("difference in SP value" in Tables 1 and 2) is 8.0 MPa$^{1/2}$ or greater (Example 23), the jettability and the re-jettability of the ink are further improved.

As shown in the results of Examples 2 and 3, it was found that in a case where the value obtained by dividing the acid value of the crosslinked resin in the unit of mgKOH/g (that is, the "acid value after crosslinking (*1)") by the content of the solvent B in the unit of % by mass (that is, "(*2)") with respect to the total amount of the ink (that is, "(*1)/(*2)") is 7 or greater (Example 2), the jettability and the re-jettability of the ink are further improved.

As shown in the results of Examples 4 and 6, it was found that in a case where "(*1)/(*2)" is 15 or less (Example 4), the preservation stability of the ink is further improved.

As shown in the results of Examples 12 and 13, it was found that in a case where the solvent B contains at least one of a monoalcohol compound having a boiling point of 70° C. to 140° C. or a glycol monoether compound having a boiling point of 70° C. to 140° C. (Example 12), the drying properties and the lamination strength of the image are further improved.

As shown in the results of Examples 1 and 10, it was found that in a case where the content of the solvent B is 5% by mass or greater with respect to the total amount of the ink (Example 1), the drying properties and the lamination strength of the image are further improved.

As shown in the results of Examples 8 and 9, it was found that in a case where the content of the solvent B is 10% by mass or less with respect to the total amount of the ink, the jettability and the re-jettability of the ink are further improved.

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a polychromic image was recorded using the cyan ink and at least one ink other than the cyan ink.

What is claimed is:

1. An inkjet ink for an impermeable base material, comprising:
    water;
    a resin-coated pigment in which at least a part of the pigment is coated with a crosslinked resin;
    a solvent A which is an alkanediol compound having a boiling point of 180° C. to 200° C.;
    a solvent B which is at least one of a monoalcohol compound having a boiling point of 70° C. to 160° C. or a glycol monoether compound having a boiling point of 70° C. to 160° C., wherein a content of the solvent B is in a range of 5% by mass to 10% by mass with respect to a total amount of the inkjet ink for the impermeable base material, and the impermeable base material is a resin base material containing at least one of polypropylene, polyethylene terephthalate, nylon, polyethylene, or polyimide; and
    a resin component which is at least one of resin particles or a water-soluble resin, wherein a value obtained by subtracting an SP value of the resin component from an average SP value of the solvent A and the solvent B is 8.0 MPa$^{1/2}$ or greater.

2. The inkjet ink for an impermeable base material according to claim 1,
    wherein the resin component includes the resin particles.

3. The inkjet ink for an impermeable base material according to claim 1,
    wherein a value obtained by dividing an acid value of the crosslinked resin in a unit of mgKOH/g by a content of the solvent B in a unit of % by mass with respect to a total amount of the inkjet ink for an impermeable base material is in a range of 7 to 15.

4. The inkjet ink for an impermeable base material according to claim 1,
    wherein the solvent B includes at least one of a monoalcohol compound having a boiling point of 70° C. to 140° C. or a glycol monoether compound having a boiling point of 70° C. to 140° C.

5. The inkjet ink for an impermeable base material according to claim 1,
    wherein a total proportion of the solvent A and the solvent B in all organic solvents in the inkjet ink for an impermeable base material is in a range of 80% by mass to 100% by mass.

6. An image recording method comprising:
    applying the inkjet ink for an impermeable base material according to claim 1 onto an impermeable base material using an ink jet method to record an image.

7. A method of producing a laminate, comprising:
    obtaining an image recorded material which includes the impermeable base material and the image disposed on the impermeable base material using the image recording method according to claim 6; and
    laminating a base material for lamination on the image recorded material on a side where the image is disposed to obtain a laminate.

* * * * *